Figure 3:
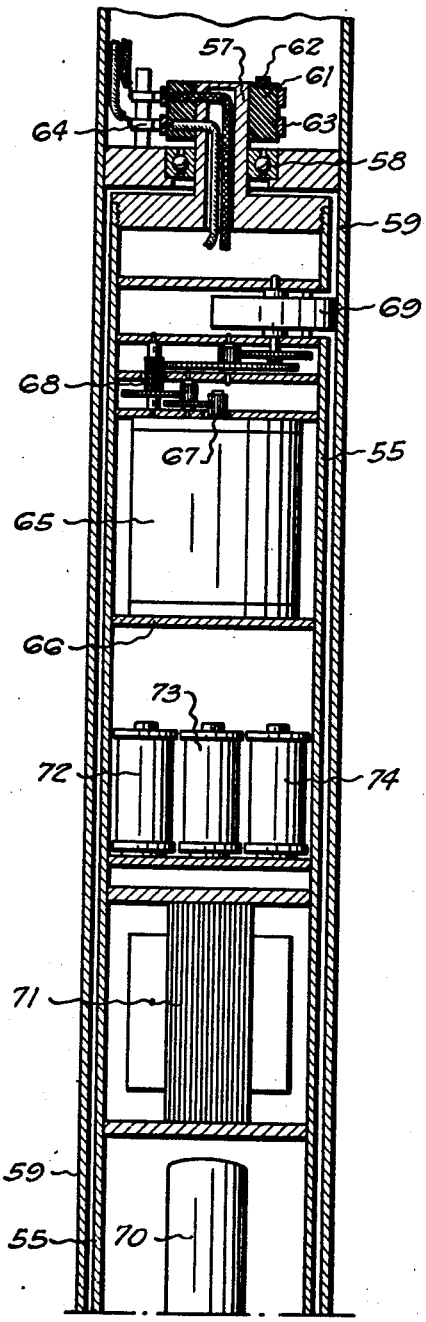

Dec. 12, 1944.   L. C. MILLER   2,364,908
COMPASS UNIT
Original Filed July 20, 1939   2 Sheets-Sheet 1
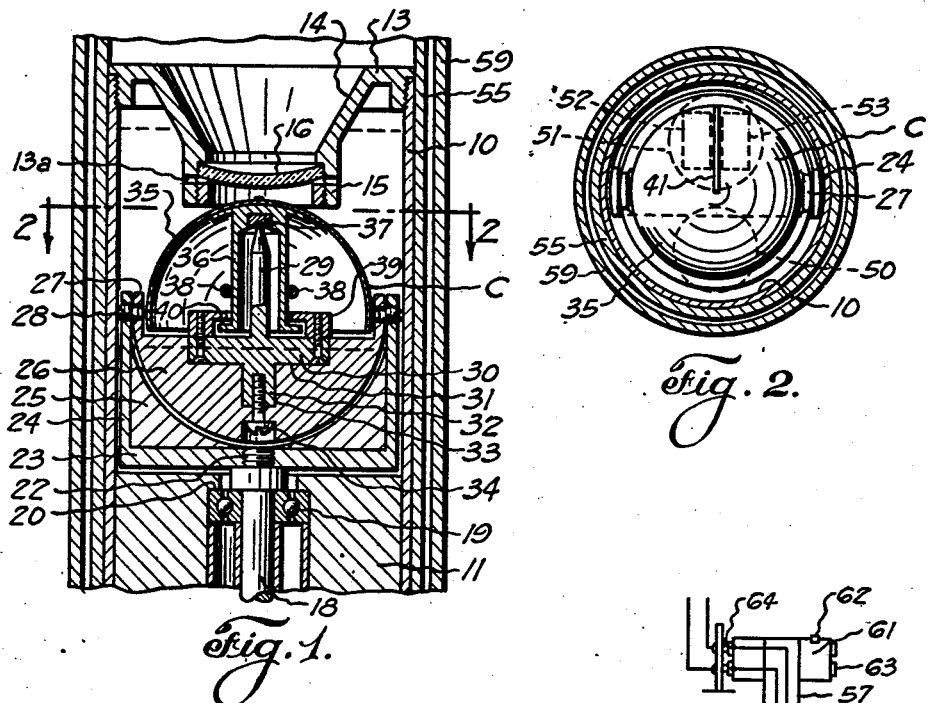
Fig. 1.
Fig. 2.
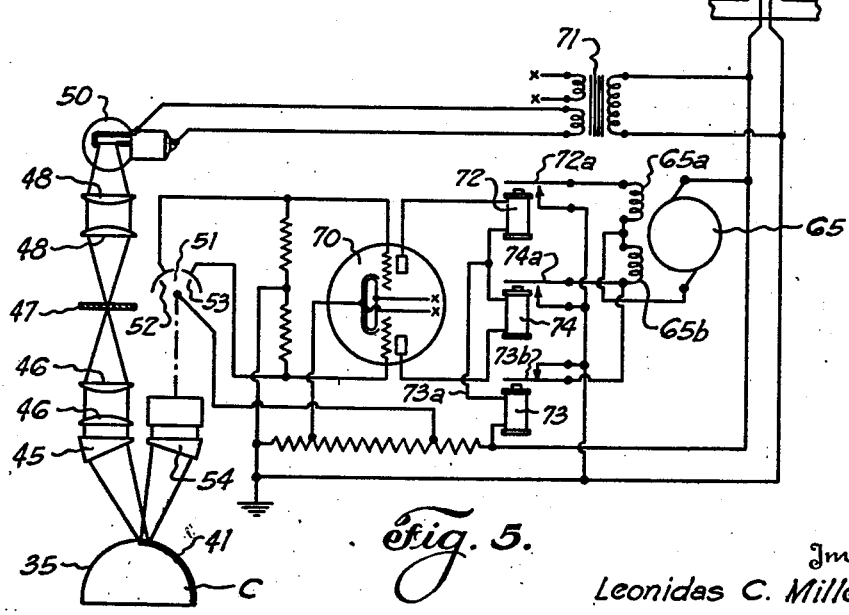
Fig. 5.
Inventor
Leonidas C. Miller
By Jack A. Ashley
Attorney Dec. 12, 1944.   L. C. MILLER   2,364,908
COMPASS UNIT
Original Filed July 20, 1939    2 Sheets-Sheet 2

Inventor
Leonidas C. Miller
By Jack A. Ehley
Attorney

Patented Dec. 12, 1944

2,364,908

UNITED STATES PATENT OFFICE 2,364,908

COMPASS UNIT

Leonidas C. Miller, Los Angeles, Calif., assignor, by direct and mesne assignments, of one-half to Eastman Oil Well Survey Company, Dallas, Tex., a corporation of Delaware, and one-half to Eastman Oil Well Survey Corporation, Long Beach, Calif., a corporation of California Original application July 20, 1939, Serial No. 285,597, now Patent No. 2,317,632, dated April 27, 1943. Divided and this application March 6, 1942, Serial No. 433,545

6 Claims. (Cl. 33—222)

This invention relates to new and useful improvements in compass units.

This application is filed as a division of my co-pending application, Serial No. 285,597, filed July 20, 1939, now Patent No. 2,317,632, dated April 27, 1943.

One object of the invention is to provide an improved compass unit which is particularly adapted for use with a well survey instrument, such as is illustrated in the above referred to application, but which may be employed elsewhere.

An important object of the invention is to provide an improved compass unit which is arranged to control the operation of an electric motor which, in turn, may control the position of a movable element, whereby said element may be maintained in a predetermined direction or position.

A particular object of the invention is to provide an improved compass unit including a hemispherical compass element which is provided with means on its upper surface adapted to co-act with a light responsive means, whereby the position of the compass element controls the actuation of the light responsive means, with the result that the position of said compass element may be utilized to indirectly control or actuate a movable member through said light responsive means.

A further object of the invention is to provide a simplified mounting for the compass element, whereby said element is maintained in a horizontal plane regardless of the inclination of the casing within which the compass unit is mounted; said mounting and unit also being sturdy in construction, whereby the device may readily withstand excessive vibration, shocks and jars without affecting the efficiency of the compass operation.

Still another object of the invention is to provide an improved compass unit, of the character described, wherein a compass element having a substantially hemi-spherical shape is employed; the entire upper surface of the element, with the exception of a radial section thereof, being either of a light reflecting or non-reflecting material, with the radial section being of a material different from the remainder, that is, if the surface is non-reflecting, the section is light reflecting and vice versa, whereby the compass element may be utilized to co-act with and actuate a light responsive means.

A particular object of the invention is to provide an improved compass, of the follow-up type which is constructed so as to operate efficiently at any position of inclination from the vertical to the horizontal; the device also having means for immediately moving said device to its predetermined set position in the event the instrument within which it is mounted is rapidly rotated, whereby efficient operation under any conditions is assured.

The construction designed to carry out the invention will be hereinafter described together with other features of the invention.

Figure 4:
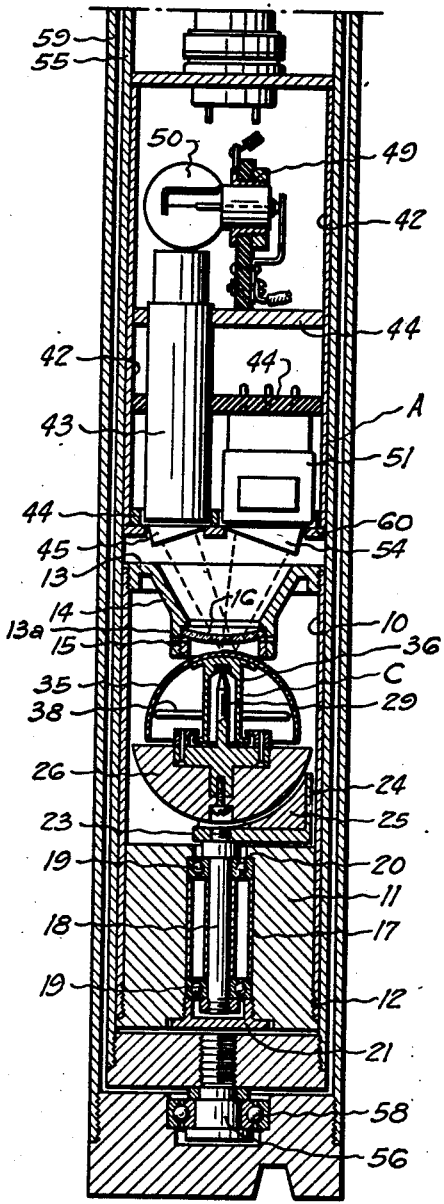

The invention will be more readily understood from a reading of the following specification and by reference to the accompanying drawings, as an example of the invention is shown, and wherein:

Figure 1 is a transverse, vertical, sectional view of a compass unit constructed in accordance with the invention, Figure 2 is a horizontal, cross-sectional view, taken on the line 2—2 of Figure 1, Figure 3 is a transverse, vertical sectional view of the portion of a well instrument within which the compass unit may be mounted, Figure 4 is a continuation of Figure 3 and showing the compass unit in position within the lower end of the instrument, and Figure 5 is a wiring diagram of the parts shown in Figure 4 and illustrating the control of an electric motor by the compass unit.

In the drawings, the numeral 10 designates a tubular shell or casing which has its lower end closed by a block 11 which is preferably secured within the lower portion of the shell by suitable screw-threads 12. The upper end of the shell is closed by a cap member 13 which is threaded into the shell and which is formed with a downwardly extending, conical sleeve 14. The sleeve is located axially on the cap member, being formed integral therewith, and said sleeve is reduced toward its lower end, as is clearly shown in Figures 1 and 4. The extreme lower end of the conical sleeve 14 terminates in a collar 15, within which a curved window 16 is mounted. Manifestly, the interior of the shell 10 between the cap member 13 and the block 11 is closed and may retain a suitable fluid or liquid for damping the movement of a compass C which is mounted therein; the level of the liquid within the compass chamber is spaced from the cap member 13 to provide an air space thereabove and reduced ports or orifices 13a extend through the sleeve 14 immediately below the window 16, whereby the formation of air bubbles below the window is obviated. The provision of the window 16 permits the entry of light rays into the interior, as will be hereinafter explained.

For mounting the compass C within the shell, the block 11 in the lower portion thereof is formed with an axial bore 17 which extends entirely therethrough. A shaft 18 which extends axially of the bore is mounted therein on suitable ball bearings 19, which are located at the upper and lower portions of the bore, the upper bearings engaging an internal annular shoulder 20 while the lower bearings are held in place by a flanged retaining cap 21. The extreme upper end of the shaft 18 projects above the top of the block 11 and is provided with external screwthreads, whereby an arcuate supporting bracket or collar 23 may be secured thereto. It will be evident that when the bracket is secured to the upper end of the shaft, said bracket is freely rotatable within the shell 10. The bracket which is arcuate in shape is provided with an upstanding, substantially semi-circular flange 24 which is preferably integral therewith, this flange being clearly shown in Figure 2.

A weight 25 is fastened within the upstanding flange 24 and is located at one side of the bracket 23. This weight functions to rotate the bracket in accordance with any inclination of the shell 10. It will be obvious that when the shell is inclined from the vertical, the weight 25 will always tend to fall to the low side and therefore, the bracket 23 will be rotated to a predetermined position relative to such low side.

The compass C includes a semi-spherical base 26 and this base is preferably formed of solid material. Diametrically opposed, upstanding ears 27 are formed integral with the base and are adapted to be secured to the flange 24 adjacent the ends of said flange, the ears being connected to the flange by pivot pins 28. The pivot pins 28 are misalined substantially 90 degrees from the axis of the weight 25, whereby when the shell 10 is inclined the horizontal axis of the pivot pins will always be located in a plane which is at a right angle to the direction of the inclination. When the shell is inclined, the upstanding flange 24 of the bracket 23 is, of course, also inclined but since the base 26 is weighted and is pivotally secured to the flange 24, said base will swing on the pivot pins 28 and thereby, the upper surface of the base will be maintained in a true horizontal plane.

An upwardly extending suspension or pivot pin 29 is made integral with a supporting plate 30 and said plate is adapted to fit within a recess 31 formed in the upper surface of the base member 26. The recess is formed at the central portion of the base so that the pin 29 is located axially of said base when the plate is within the recess. A depending stud 32 is formed on the plate 30 and engages within a countersunk opening 33 provided in the base. A suitable fastening screw 34 is threaded into the stud so as to fasten the plate 30 and pin 29 in position on the base member 26.

A semi-spherical compass element or shell 35 is mounted so as to be freely rotatable upon the suspension or pivot pin 29. The shell is secured to the closed upper end of a supporting sleeve 36, which sleeve is adapted to engage over the pin 29. A suitable jewel 37 may be mounted within the upper end of the sleeve to provide a bearing which rests upon the upper pointed end of the pin 29. As is clearly shown in Figure 1, the sleeve is of a diameter considerably greater than the pin 29 so as to be spaced therefrom and permit a free rotation of the compass element or shell on said pin. The usual magnets 38 are mounted within the shell 35 and are responsive to the earth's magnetism, whereby the shell is rotated to a predetermined position relative to azimuthal north. Upward displacement of the shell and of the sleeve 36 relative to the pin 29 is prevented by a flanged keeper 39 which is secured to the plate 30 and which overlies an annular flange 40 formed on the lower end of the sleeve 36.

The upper surface of the shell or compass element 35 is disposed immediately below the curved window 16 which is carried by the cap member 13. This upper surface of the shell is of a dull non-reflecting surface except for a narrow strip or bar of light-reflecting material 41. The strip or bar extends from the center of the shell (Figure 2) to the outer edge thereof and is disposed on the shell so as to constantly point in a predetermined direction. For the purposes of this description, it will be presumed that the reflecting bar or strip 41 is always pointing north, although it could be arranged on the upper surface of the shell to point in other directions. It will be obvious that when said shell is inclined, the compass element 35 is maintained in a true horizontal plane and functions to control the position or direction of the reflecting strip or bar 41. Regardless of any rotation of the shell, the compass element 35 will maintain the strip in such predetermined direction.

The compass unit C is arranged to co-act with a light projecting and a light responsive means to control the actuation of said light responsive means. The light projecting and light responsive means is illustrated in Figure 4 and is shown as mounted within a cylindrical casing 42, which casing is substantially the same size as the shell 10. This means includes a tubular lens-carrying sleeve 43 and this sleeve is disposed at one side of the opening formed by the conical sleeve 14 on the closure or cap member 13 of the shell 10. The sleeve is fastened or supported on suitable plates 44 which extend across the interior of the casing 42. A prism 45 is mounted adjacent the lower end of the sleeve 43 and serves to direct light rays which are passing through the sleeve 43, as will be explained, downwardly through the window 16 and onto the upper surface of the compass element or shell 35. As is schematically illustrated in Figure 5, the sleeve 43 has a pair of condensing lenses 46 at its lower end, while a gate 47, of the usual construction is mounted above these lenses. Above the gate upper lenses 48 are mounted within the sleeve. Secured to the uppermost plate 44 which supports the sleeve 43, is a lamp socket 49 within which an electric lamp or light source 50 is disposed. When the lamp is illuminated, light rays pass downwardly through the tubular sleeve 43 and through the lenses, which concentrate the light rays on the prism 45. The prism then directs the light rays through the window 16 and onto the light reflecting strip or bar 41 on the upper surface of the compass element.

The light rays which strike the light reflecting strip or bar 41 are reflected upwardly therefrom and onto a twin light-sensitive element, such as a twin photo tube 51, which includes photoelectric cells 52 and 53 (Figure 5). A prism 54 is interposed between the compass and the twin photo tube, both of these elements being mounted in one of the supporting plates 44 which extend across the interior of the casing 42.

Under normal conditions, when the compass is at rest with the strip 41 pointing north, the light rays from said strip are directed between the photoelectric cells 52 and 53, as is indicated by dotted lines in Figure 2. At such time, each cell is receiving an equal amount of light. Each cell may be connected to a suitable electrical apparatus, such as a relay, which may control a motor winding, or other electrical apparatus. Thus, if both cells are receiving the same amount of light, neither relay will be actuated because the equal distribution of the light will result in neither cell receiving sufficient light to actuate its electrical apparatus. However, if the compass shell or element 35 moves with relation to the photoelectric cells so as to cause more light to strike one cell, then the electrical apparatus to which that cell is connected will be actuated. Such actuation may be utilized to bring the two photoelectric cells back into alinement with the reflecting strip or bar 41.

The apparatus described herein may be used for any desired purpose and for the purpose of illustration, it is shown herein as controlling the position of an azimuth contact of a well survey instrument. Referring to Figures 3 and 4, the shell 10 is mounted in the lower end of a housing 55 which housing has a depending pin 56 at its lower end and an upstanding pin 57 at its upper end. These pins are mounted in bearings 58 which are supported in the outer case 59 of the survey instrument and in this manner, the housing 55 is freely rotatable within said case. The shell 10 which houses the compass unit is fixed or fastened within the housing so as to be rotatable therewith but not independently thereof. The light source, together with the lens system and light responsive cells are mounted within the housing 55 above the compass unit, the casing 42 of these parts being supported on an annular ring 60 secured within the housing 55. The upstanding pin 57 is provided with an insulated collar 61 which has an azimuth contact 62 secured to its upper surface and it is desirable to maintain this contact in a predetermined direction at all times. The insulated collar 61 may also have contact rings 63 on its outer periphery, which rings may be engaged by brushes 64 so that current may be conducted downwardly to the electrically operated parts. The azimuth contact 62 is so mounted on the collar 61 that it is in vertical alinement with the radially extending reflecting strip or bar 41 on the compass element 35.

The survey instrument is ordinarily lowered by means of a cable or wire line, whereby the outer case 59 of said instrument may rotate as it is being lowered. Obviously, the instrument will assume an inclination in accordance with the inclination of the bore. In order to accomplish a proper survey, it is desirable that the azimuth contact 62 be maintained in a predetermined direction at all times, regardless of the rotation of the case 59 or regardless of any inclination of the well bore.

For imparting a rotation to the housing 55, a follow-up motor 65 is provided and is supported on a suitable transverse plate or deck 66 which is located in the upper portion of the housing 55. The motor shaft has a drive pinion 67 which has connection through a reduction gear train 68 with a friction drive wheel 69. The wheel is mounted at one side of the housing 55 and its periphery rides upon the wall of the case 59 of the survey instrument. Manifestly when the follow-up motor 65 is actuated to rotate the wheel in one direction or the other, said wheel imparts a rotation to the housing 55, such rotation being relative to the outer case 59. Since the azimuth contact 62 is carried by the upstanding pin 57 of the housing 55, any rotation of the housing will result in a rotation of the contact 62. Thus, regardless of the position of the outer case 59, the position of the inner housing 55 and of the azimuth contact 62 carried thereby can be maintained through the operation of the follow-up motor 65.

The twin photo tube 51, which is responsive to the light being reflected by the compass element 35, is arranged to control the operation of the follow-up motor 65. The motor has a double winding 65a and 65b so that its shaft may be rotated in either direction to drive the pinion 67 in either direction. The electrical circuit, in which the twin photo tube and the motor are connected, includes a twin amplifying tube 70, a power transformer 71, and a trio of relays 72, 73 and 74, these elements being mounted within the housing 55 on suitable transverse supports which are disposed between the casing 42 and the follow-up motor 65.

The photoelectric cell 52 is arranged to close the circuit through the relay 72 to the winding 65a of the motor to rotate the motor shaft in one direction, while the other photoelectric cell 53 is adapted to close the circuit to the other winding 65b of the motor through the relay 74. Thus, if the cell 52 is receiving more light, as reflected by the light reflecting strip 41 of the compass, then the winding 65a is energized to rotate the shaft of the motor 65 in one direction; if the cell 53 is receiving more light, then the motor shaft is rotated in an opposite direction.

As has been explained, the light responsive cells 52 and 53, are normally located, one on each side of the light reflecting strip 41. With the compass at rest and the strip 41 pointing north, the azimuth contact 62 is also pointing north and at such time, the light rays from the strip 41 are directed between the cells 52 and 53, with each cell receiving an equal amount of light, such amount being insufficient to actuate the relays controlling the motor windings 65a and 65b. If the compass element or shell 35 of the compass moves with relation to the photo tube so as to cause more light to strike one cell, then the motor winding controlled by that cell is actuated and such actuation, results in a rotation of the casing or housing 55 to automatically cause alinement of the cells 52 and 53 with the strip 41. In other words, the follow-up motor 65 rotates the casing in one direction or the other so that the relative position of the casing or housing 55 to the compass element 35 is maintained. When such position is maintained, the azimuth contact 62 is held in a proper position with relation to a predetermined direction.

It is not believed necessary to describe in detail the wiring diagram shown in Figure 5. The relay 72 controls electrical contacts 72a which close an electrical circuit to the winding 65a, while the relay 74 controls contacts 74a which close an electrical circuit to the winding 65b. It might be noted that the relay 73 is merely an emergency relay. It might occur in some instances that the outer case 59 may be rotated very rapidly, in which case the compass shell 35, in seeking north, would move the reflecting strip 41 completely from beneath both of the cells 52 and 53, with the result that neither could operate its relay to realine said cells with the strip. In the event that this should occur, the emergency relay 73 comes into operation. As shown in Figure 5, the relay 73 is connected to the relays 72 and 74 by a wire 73a and is arranged to control contacts 73b. These contacts are adapted to complete the circuit to the winding 65b of the motor 65. The relay 73 is so connected in the circuit that when both cells 52 and 53 are receiving light, at which time their relays 72 and 74 are inoperative, the relay 73 is energized since it is in fact, connected to both cells. Energization of the relay 73 holds its contacts 73b open and so long as either or both cells are receiving light, the circuit through these contacts is open. However, in the event no light strikes either cell, the relay 73 is de-energized allowing the contacts 73b to close the circuit to the motor winding 65b, whereby the motor shaft is rotated in one direction to impart rotation to the casing. Such rotation continues until one of the cells 52 or 53 again receives the reflected light, at which time the cells again actuate their relays to aline the strip 41 with the photoelectric tube 51. As soon as the photoelectric cells again come into operation the relay 73 is re-energized to open its contacts 73b.

From the foregoing, it will be seen that the compass unit co-acts with the light responsive means to control a suitable electrical apparatus. In the adaptation of the invention herein illustrated, the unit controls the position of an azimuth contact in a well survey instrument. However, since the photoelectric cells 52 and 53 may control the operation of relays, such relays may, in turn, control any desired electrical circuit to perform any desired function. For this reason, the invention is not to be limited to use in the particular type of survey instrument herein disclosed. The compass unit is very sturdy in construction and is mounted so that the compass shell 15 operates in a true horizontal plane under all conditions. A damping fluid or liquid is introduced into the shell 10 and surrounds the movable compass elements so as to damp the movement thereof. Although the lens system and twin photo tube arrangement have been illustrated as mounted within a separate casing 42 which is disposed above the shell 10 of the compass unit, it is obvious that these parts may all be mounted within a single tubular casing or shell so as to provide a unitary structure. Also, the invention could be carried out by making the entire surface of the compass element 35 of a light reflecting material while the strip 41 could be made of a non-reflecting material. In this case, the operation would be the same.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with a movable element of a compass unit for controlling the position of said element, said unit including, a housing, a compass member mounted in the housing and responsive to the earth's magnetism, the compass member being substantially semi-spherical in shape with its outer curved surface being of non light-reflecting material, a strip of light reflecting material secured latitudinally to the outer surface of the member and extending from the pivot axis to the edge thereof, said strip being maintained in a predetermined direction by said compass member, a light source above the compass member for directing light rays onto the upper surface thereof, and actuating means connected with the movable element for controlling the movement of the same, said means being responsive to light rays reflected by said strip of reflecting material, whereby the actuating means co-acts with the radially extending strip on the compass member to move and maintain said element in a predetermined position in accordance with the position of the strip on said compass element.

2. The combination with a movable element of a compass unit for controlling the position of said element, said unit including, a housing, a compass member mounted in the housing and responsive to the earth's magnetism, the compass member being substantially semi-spherical in shape with its outer curved surface being of nonlight-reflecting material, a strip of light reflecting material secured latitudinally to the outer surface of the member and extending from the pivot axis to the edge thereof, said strip being maintained in a predetermined direction by said compass member, a pair of light responsive cells above the compass member and connected with the movable element for controlling movement of said element, and a light source above the compass member for directing light rays onto the outer surface thereof, whereby when the rays strike the reflecting strip on said member, said rays are reflected to the light responsive means, to actuate the same and thereby control the position of the movable element in accordance with the position of the strip on the compass member, said light reflecting strip being normally disposed between the light responsive cells so that said cells are normally inactive because of insufficient light and it is only when said strip moves from its intermediate position with respect to said cells that one or the other of the cells are operated to impart movement to the movable member.

3. A compass unit including, a housing, and a semi-spherical compass element magnetically controlled mounted axially within said housing, said element having a portion of its outer surface of nonlight-reflecting material and the remainder thereof of a light-reflecting material, one of said materials being in the form of a narrow strip extending from the pivot axis to the outer edge of said compass element.

4. A compass unit including, a housing, a supporting block closing the lower end thereof, a carrier rotatably mounted on said block and arranged to be rotated by gravity to a predetermined position relative to the low side of a well bore when the unit is lowered thereinto, a weighted compass support pivotally secured to the carrier, said compass member being substantially semi-spherical in shape and having its outer surface of nonlight-reflecting material, and a latitudinal strip of light reflecting material secured to the outer surface of the member and extending from the axis of rotation to the outer edge thereof.

5. A compass unit including, a housing, and a semi-spherical compass element magnetically controlled mounted axially within said housing, said element having its outer surface of light-reflecting material, and a latitudinal strip of non-reflecting material following the contour of the outer surface of the compass element and extend-